Figure 1:
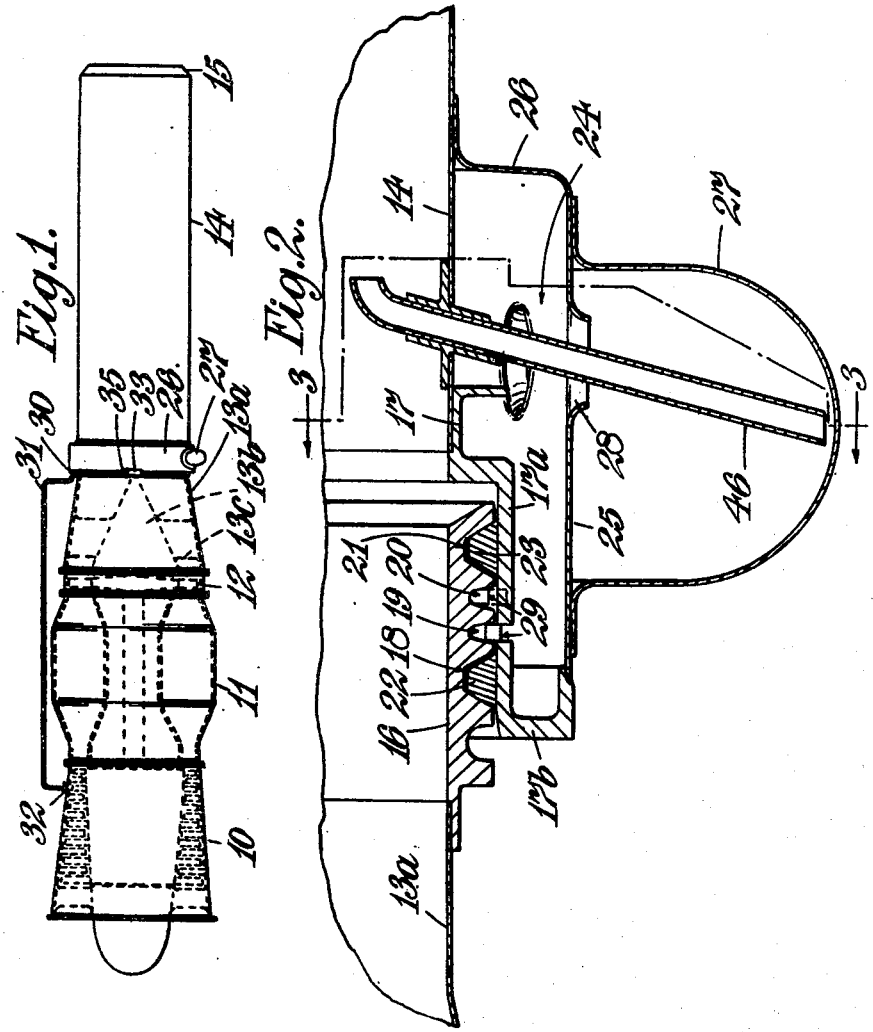

Aug. 23, 1960 — A. A. RUBBRA — 2,949,736
EXPANSION JOINT WITH FUEL DRAINAGE COLLECTOR
FOR DUCTING OF GAS TURBINE POWER PLANTS
Filed Sept. 28, 1953

United States Patent Office 2,949,736
Patented Aug. 23, 1960

2,949,736

EXPANSION JOINT WITH FUEL DRAINAGE COLLECTOR FOR DUCTING OF GAS TURBINE POWER PLANTS

Arthur Alexander Rubbra, Littleover, Derby, England, assignor to Rolls-Royce Limited, Derby, England, a British company Filed Sept. 28, 1953, Ser. No. 382,668

Claims priority, application Great Britain Oct. 3, 1952

12 Claims. (Cl. 60—39.32)

This invention relates to gas-turbine power plants, and more particularly to such power plants as are used in aircraft.

It has been found that under certain circumstances leakage of fuel may take place at the joint between two working fluid duct parts of the gas-turbine power plant, for example, at the joint between two duct parts at the downstream end of a combustion chamber of the power plant, or at the joint between an exhaust cone structure such as usually forms the outlet from a turbine, and a jet pipe connected to the outlet end of the exhaust cone. Such leakage of fuel is undesirable as it produces a risk of fire in the aircraft. One object of the invention is to lessen this risk.

According to this invention, a gas-turbine power plant comprises a working fluid duct structure which is liable to be heated in operation of the power plant and which includes two adjacent duct parts joined by an expansible joint which includes two seals in flow series in the leakage path through the joint from the duct, fuel collector means formed on one only of said duct parts and having a fuel collecting space connected to the leakage path between said two seals to receive leakage fuel therefrom, and means to deliver said leakage fuel from the collecting space to within a working fluid passage of said power plant.

According to a feature of the invention, the means to deliver the leakage fuel to within the working fluid passage comprises means to pressurise the collecting space of said collector means, and conduit means leading from said collector means into the working fluid passage. The pressurising means may be provided by a connection to a compressor of the power plant.

According to another feature of the invention, the means to deliver the leakage fuel to within the working fluid passage comprises a venturi within the duct structure and conduit means leading from the collecting space of the collector means to the throat of the venturi.

The expansible joint between the two working fluid duct parts may be of the kind permitting relative sliding movement of the duct parts to permit thermal expansion of the parts relative to one another, and in this case the sealing means provided between the duct parts to minimise leakage of the working fluid may be in the form of sealing rings received in grooves in one of the parts and co-operating with the other part. In the event of fuel collecting in the working fluid duct adjacent the joint, a quantity of this fuel may leak past the first sealing ring into the space between the two sealing rings and it is arranged that any fuel reaching this space will drain into the collecting space of the collector means and will be returned into the working fluid passage. Where the duct parts are of circular cross-section, the two sealing rings may lie between the two parts and be of the same radius, or the end of one duct part may be of forked cross-section to receive between its limbs the end of the other duct part and in this case the two sealing rings may lie in the same plane transverse to the axis of the working fluid passage.

Figure 2:
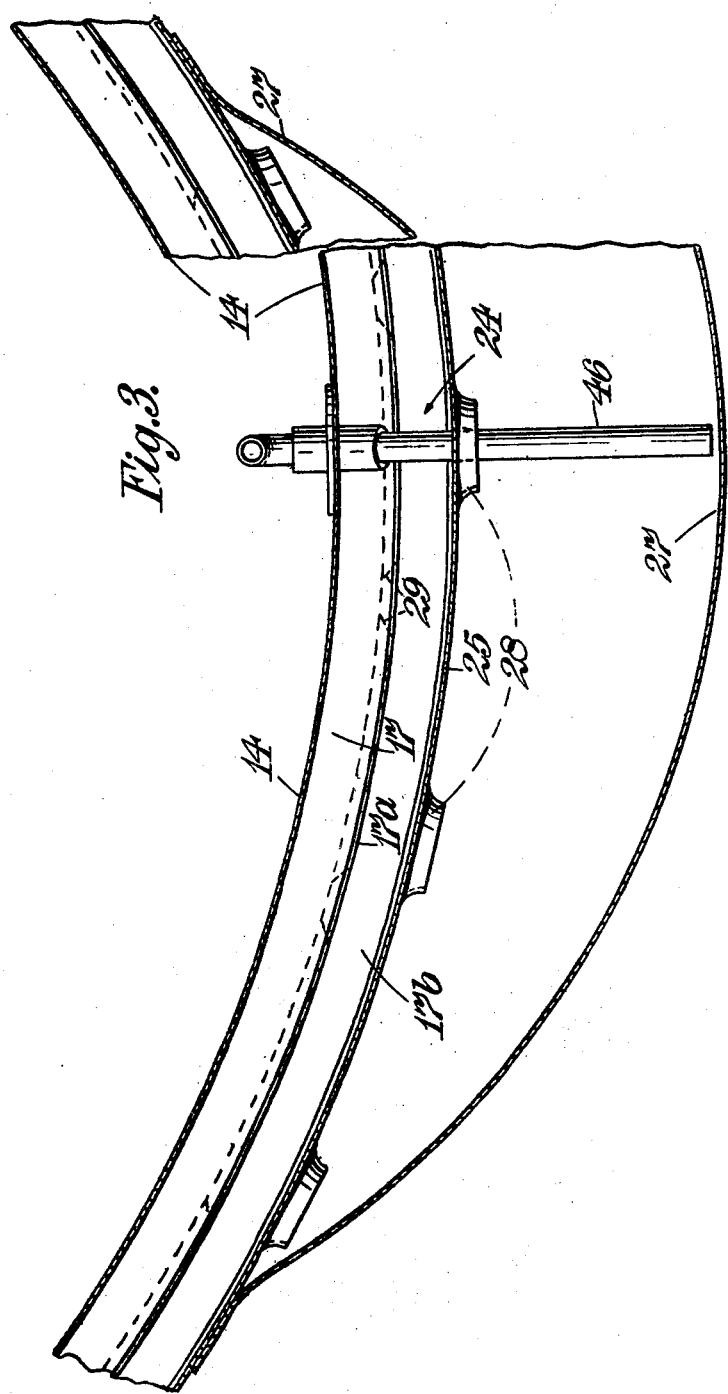
Figure 3:
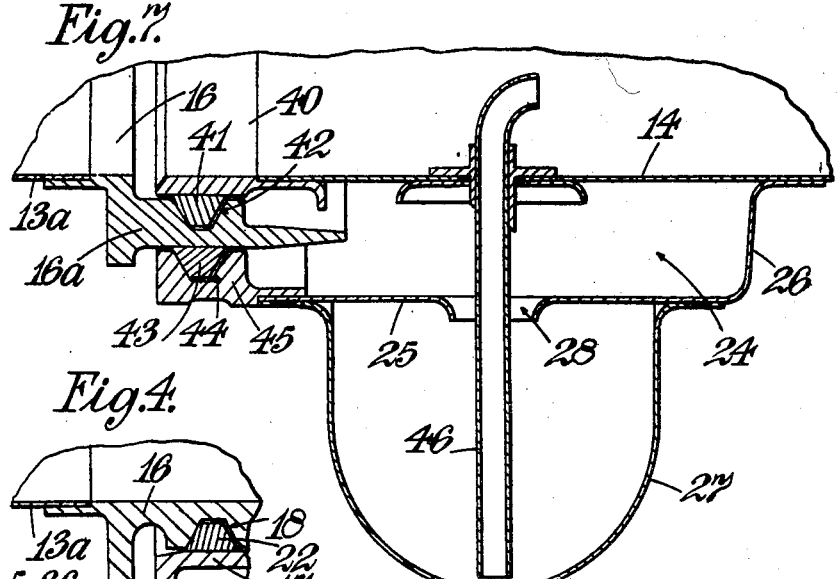
Figure 4:
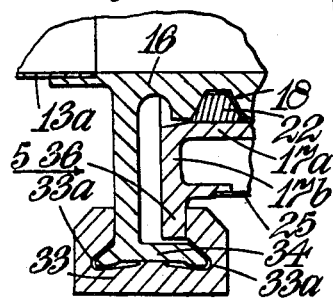
Figure 5:
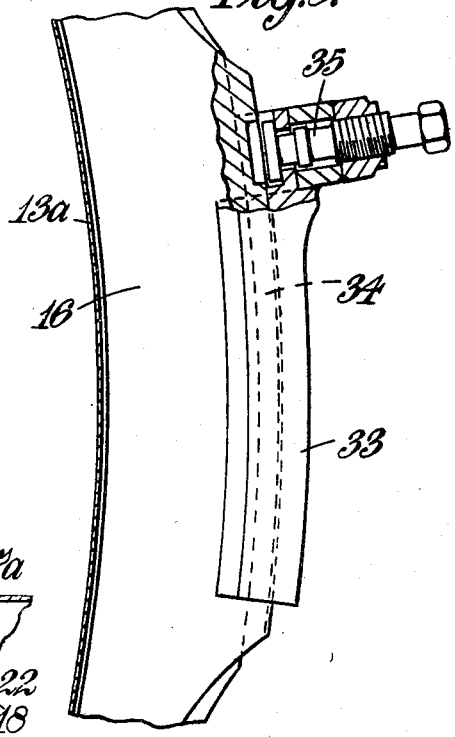
Figure 6:
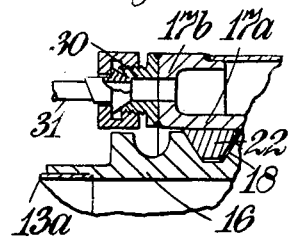
Figure 8:
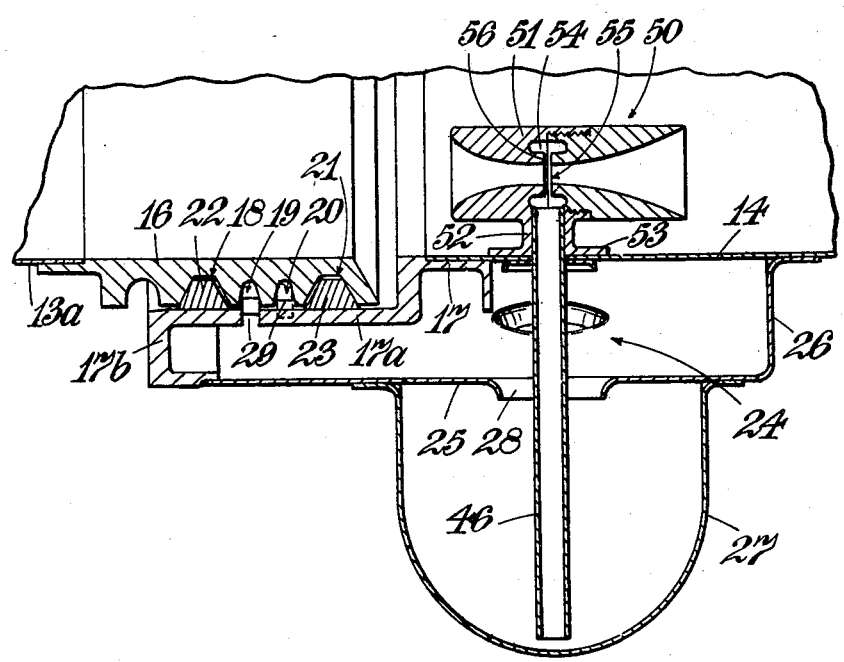

A number of embodiments of the invention will now be described by way of example, the description making reference to the accompanying drawings, in which:

Figure 1 is a diagrammatic illustration of a gas-turbine engine,

Figure 2 is an axial section through one embodiment of expansible joint and collector means, Figure 3 is a section on the line 3—3 of Figure 2, Figure 4 is a detail of construction, Figure 5 is a view in the direction of arrow 5 on Figure 4, Figure 6 is another detail of construction, Figure 7 is a view corresponding to Figure 2 of a second embodiment of expansible joint and collector means, and Figure 8 is a view of a third embodiment.

Referring to Figure 1, the gas-turbine engine comprises a compressor 10, combustion equipment 11 connected to receive air compressed in the compressor 10 and to have fuel burnt in it, a turbine 12 connected to receive the products of combustion from the combustion equipment 11, an exhaust cone structure 13 at the outlet of the turbine 12, and a jet pipe 14 terminating in a propulsion nozzle 15 connected to receive the exhaust gases from the exhaust cone structure 13. The exhaust cone 13 and jet pipe 14 together constitute a duct through which the jet gases are exhausted to atmosphere. It is usual for the engine and jet pipe to be installed within the structure of an aircraft, for example in wing structure.

The exhaust cone structure 13 comprises an outer frusto-conical wall 13a, and a coaxial inner conical wall 13b supported from the wall 13a by struts 13c.

An expansible sliding joint is provided between the downstream end of the wall 13a of the exhaust cone structure 13 and the upstream end of the jet pipe 14.

The internal diameters of the wall 13a of the exhaust cone structure 13 at its outlet end and of the jet pipe 14 at its inlet end are arranged to be substantially equal so as to provide a comparatively smooth internal surface to the exhaust gas duct at the joint.

In certain circumstances, for example when starting the engine while the aircraft is airborne, unburnt fuel may find its way, for example from the main combustion equipment 11, into the exhaust cone structure 13 or jet pipe 14 or both, and this fuel may lie in the bottom of the jet pipe 14, which is normally of circular section, the amount of fuel which collects in this area depending on the shape of the jet pipe 14 and the attitude of the aircraft. The fuel tends to be forced by the pressure within the exhaust cone structure 13 and jet pipe 14 out through the expansible sliding joint provided between the wall 13a of the exhaust cone structure 13 and the jet pipe 13 into the aircraft structure, and consequently there is a risk of fire.

To substantially eliminate this risk, the expansible sliding joints illustrated are provided with means to collect the leakage fuel and to deliver the fuel back into the jet pipe downstream of the joint.

Referring to Figures 2 to 6, the expansible joint illustrated comprises a thick ring 16 secured on the outlet end of the exhaust cone wall 13a and a co-operating ring 17 secured on the inlet end of the jet pipe 14 and having an axially-extending portion 17a to fit closely over the ring 16 on the end of the exhaust cone wall 13a.

The external surface of the ring 16 on the end of the exhaust cone wall 13a is formed with four axially-spaced circumferential grooves 18, 19, 20, 21, each of the two end grooves 18, 21 receiving a corresponding sealing ring 22, 23 respectively, co-operating with the internal surface of the ring 17 on the end of the jet pipe 14. The sealing rings 22, 23 and their grooves 18, 21 are trapezoidal in section, the parallel faces of each ring being at its inner and outer radii and the shorter parallel face being at the bottom of the corresponding groove.

An annular chamber 24 is formed to encircle the jet pipe 14 adjacent its upstream end, and the chamber 24 has a first radial wall formed by a flange 17b on the end ring 17 on the jet pipe 14, and an outer wall 25 and a second radial wall 26 afforded by a sheet metal part encircling and welded to the jet pipe 14, and an inner wall constituted by the jet pipe 14 and its end ring 17, 17a.

The outer wall 25 of the annular chamber 24 has welded to it adjacent the bottom portion of the jet pipe 14 a sheet-metal blister piece 27 extending over approximately one-eighth of the circumference of the jet pipe 14. The blister piece 27 constitutes a fuel collecting sump into which fuel may drain from the jet pipe 14 through the joint, the sump being in communication with the annular chamber 24 through a number of spaced holes 28 in the outer wall of the chamber 24, and the chamber 24 (and thus the sump) being in communication with the two central grooves 19, 20 formed in the external surface of the end ring 16 of the exhaust cone wall 13a through a series of slots 29 in the axially-extending portion 17a of the jet pipe end ring 17. The slots 29 are so arranged, that throughout a limited range of relative sliding of the two end rings 16, 17 the annular chamber 24 is maintained in communication with the two central grooves 19, 20. Conveniently there are two axially-spaced rows of circumferentially-extending slots 29, there being 16 equally-spaced slots in each row and the slots of one row being staggered circumferentially with respect to those of the other row.

The annular chamber 24 and fuel collecting sump are pressurised in operation of the engine by being connected to a high-pressure stage of a compressor 10 of the gas-turbine engine. The connection may conveniently be made (see Figures 1 and 6) by means of a pipe union 30 welded to the jet pipe end ring 17, say to the radial flange 17b thereof, the union 30 being connected by a pipe 31 to a tapping point 32 on the compressor 10.

A stand-pipe 46 is also provided which extends substantially vertically from adjacent the bottom of the fuel collecting sump to within the jet pipe 14, and is located on the vertical centre line of the jet pipe 14. The stand-pipe 46 is conveniently supported by being welded to the skin of the jet pipe 14, and passes through one of the holes 28 in the outer wall 25 of the annular chamber 24. The end of the stand-pipe 46 which extends into the jet-pipe 14 is turned over so that the outlet from it faces downstream of the direction of flow of the working fluid.

With this arrangement, any liquid fuel which is caused to leak from within the jet pipe 14 past the sealing ring 23 on the exhaust cone end ring 16 flows through one of the slots 29 in the jet pipe end ring 17 into the annular chamber 24 and then through the holes 28 in the outer wall 25 of the annular chamber 24 into the fuel collecting sump in the blister piece 27. If the fuel in the sump is of sufficient depth to cover the bottom of the stand-pipe 46, the air pressure which develops within the sump when the engine is operating causes the fuel to be forced up the stand-pipe 46 into the jet pipe 14. The velocity of the exhaust gases flowing in the jet pipe 14 is related to the compressor delivery pressure, and it may usually be arranged that when the compressor delivery pressure is sufficient to force the fuel up the stand-pipe 46, the exhaust gas velocity is high enough to carry away and disperse the ejected fuel.

The extent of axial separation of the end rings 16, 17, is limited by a pair of keep plates 33, one on each side of the jet pipe 14. The keep plates 33 (Figures 4 and 5) are of channel form with undercut side walls 33a, and they straddle local flanges 34 on the end ring 16 to which the keep plates are locked by clamps 35 adapted to engage in aligned holes in keep plates 33 and flanges 34.

The rings 17 also have local flanges 36 which project into the channels of the keep plates 33 and abut the side walls 33a thereof, to limit separation of the rings 16, 17.

Referring now to Figure 7, the construction illustrated is similar to that above described, except that the exhaust cone end ring 16 is of substantially L-section, the longer arm 16a of which extends axially downstream at a somewhat greater radius than the wall 13a of the exhaust cone structure 13. The upstream end of the jet pipe 14 is encircled as before by an annular chamber 24 of which the radially inner wall is part of the wall of the jet pipe 14, and of which the radially outer wall 25 and downstream radial wall 26 are afforded by an annular sheet-metal member which is welded to the jet-pipe 14 over a flange at the inner end of the radial wall 26. The upstream end of the wall of the jet pipe 14 is formed with an end ring 40 having a cylindrical external surface, and this co-operates with a sealing ring 41 in a circumferential groove 42 in the inner surface of the axially-extending arm 16a of the exhaust cone end ring 16. The outer surface of the axially-extending arm 16a is of cylindrical form, and co-operates with a sealing ring 43 in an internal circumferential groove 44 in a thick ring 45 attached to the upstream end of the outer wall 25 of the annular chamber 24. The grooves 42, 44 and sealing rings 41, 43 are trapezoidal in section, the parallel faces at the inner and outer radii, and the shorter parallel face in each cone being at the bottom of the corresponding groove.

The upstream end of the jet pipe 14 is thus in effect forked to receive the axially-extending arm 16a of the exhaust cone end ring 16, and the space between the two seals 41, 43 is constituted by the annular chamber 24.

As in the previous construction the outer wall 25 of the chamber 24 has secured to it the fuel-collecting sump blister piece 27 to collect any fuel which leaks from the jet pipe 14 past the first sealing ring 41, and from which any leakage fuel is delivered back into the jet pipe 14 through the stand-pipe 46.

There is shown in Figure 8 an alternative method by which the fuel collected in the sump is returned to the jet pipe, which avoids the need for the connection to the compressor delivery tapping. In this embodiment there is secured to the inside of the jet pipe wall 14 a venturi member 50 which comprises a venturi body 51, a stem 52, and a flange 53 by which the venturi member is welded to the jet pipe wall. The body 51 has an annular gallery 54 encircling the throat 55 of the venturi, and in communication therewith through a slot 56, and the stand-pipe 46 extends through a central hollow bore in the stem 52 into communication with the gallery 54. Conveniently the venturi member is made in two parts as shown, the member being split transversely adjacent the throat and the parts being in threaded engagement with one another.

In this way fuel collected in the sump, for example during starting of the engine, is sucked into the jet pipe when the velocity of the jet gases rises to a high enough value. The venturi is so dimensioned that the fuel is sucked into the jet pipe at a rotational speed below the maximum rotational speed of the engine.

The modification of Figure 8 is shown as applied to the construction of Figure 6, but is clearly applicable to other constructions, e.g. that of Figure 7.

The invention has been described as applied to the joint between the exhaust cone structure and the jet pipe 14, but it is also applicable to joints between two parts of the jet pipe.

I claim:
1. A gas-turbine power plant comprising a jet pipe for conveying a working fluid which jet pipe is liable to be heated in operation of the power plant and includes two adjacent ducting parts and an expansible joint connecting the two ducting parts and permitting relative axial displacement of the adjacent ends of the ducting parts, which expansible joint includes two seals in flow series in the leakage path through the joint from the passage through said jet pipe, fuel collector means formed on one only of said duct parts and having a fuel collecting space connected to the leakage path between said two seals to receive leakage fuel therefrom, the connection between the leakage path and the fuel collector means being maintained throughout said relative axial displacement, and means to deliver said leakage fuel from the collecting space to within a working fluid passage of said power plant.

2. A gas-turbine power plant as claimed in claim 1, wherein the means to deliver the leakage fuel to within the working fluid passage comprises means to pressurize the collecting space of said collector means, and conduit means leading from said collector means into the working fluid passage.

3. A gas-turbine power plant as claimed in claim 2, wherein the pressurizing means for pressurizing the collecting space includes a conduit connected to place said space in communication with compression stage of the engine compressor.

4. A gas-turbine power plant as claimed in claim 1, wherein the means to deliver the leakage fuel to within the working fluid duct comprises a venturi within the jet pipe and conduit means leading from the collecting space of the collector means to the throat of the venturi.

5. In a gas-turbine power plant having a passage in which working fluid flows, a jet pipe for conveying working fluid during operation of the power plant and which is liable to be heated in operation of the power plant, said jet pipe comprising a first duct part and a second duct part adjacent thereto, an expansion joint joining said first and second duct parts and permitting relative axial displacement of the adjacent ends of the ducts parts, said expansion joint including means defining a leakage path through the joint between said first and second duct parts from within the jet pipe to externally thereof, first and second gas-sealing means between said first and second duct parts thereby to reduce the leakage of working fluid through said leakage path, said first and second gas-sealing means being in flow series in said leakage path, means defining a fuel collector space, the last-mentioned means being formed on one only of the duct parts, said fuel collector space being maintained in communication with said leakage path between said first and said second gas-sealing means throughout said relative axial displacement, and means to deliver leakage fuel from said fuel collector space to within said passage in which working fluid flows.

6. In a gas-turbine power plant having a compressor, combustion equipment in which air delivered by the compressor is heated by combustion, and a turbine to which the air heated by combustion is delivered and connected to the compressor to drive it, and having a passage in which working fluid flows, a jet pipe for conveying working fluid during operation of the power plant and which is liable to be heated in operation of the power plant, said jet pipe comprising a first duct part and a second duct part adjacent thereto, an expansion joint joining said first and second duct parts and permitting relative axial displacement of the adjacent ends of the duct parts, said expansion joint including means defining a leakage path through the joint between said first and second duct parts from within the jet pipe to externally thereof, first and second gas-sealing means between said first and second duct parts thereby to reduce the leakage of working fluid through said leakage path, said first and second gas-sealing means being in flow series in said leakage path, means defining a fuel collector space, the last-mentioned means being formed on one only of the duct parts, said fuel collector space being maintained in communication with said leakage path between said first and said second gas-sealing means throughout the extent of said permitted relative axial displacement of the ends of the duct parts, conduit means opening adjacent the lowest part of said fuel collector space and opening at its other end into said passage in which working fluid flows, and means interconnecting said fuel collector space and said compressor to place said space under pressure.

7. In a gas-turbine power plant having a compressor, combustion equipment in which air delivered by the compressor is heated by combustion, and a turbine to which the air heated by combustion is delivered and connected to the compressor to drive it, and having a passage in which working fluid flows, a jet pipe for conveying working fluid during operation of the power plant and which is liable to be heated in operation of the power plant, said jet pipe comprising a first duct part and a second duct part adjacent thereto, an expansion joint joining said first and second duct parts and permitting relative axial displacement of the adjacent ends of the duct parts, said expansion joint including means defining a leakage path through the joint between said first and second duct parts from within the jet pipe to externally thereof, first and second gas-sealing means between said first and second duct parts thereby to reduce the leakage of working fluid through said leakage path, said first and second gas-sealing means being in flow series in said leakage path, means defining a fuel collector space, the last-mentioned means being formed on one only of the duct parts, said fuel collector space being maintained in communication with said leakage path between said first and said second gas-sealing means throughout the extent of said permitted relative axial displacement, venturi means in said passage in which working fluid flows and aligned with said flow, and conduit means opening at one end to said fuel collector space and at its other end to the throat of said venturi.

8. On a gas-turbine power plant having a passage in which working fluid flows, a jet pipe for conveying working fluid during operation of the power plant and which is liable to be heated in operation of the power plant, said jet pipe comprising a first duct part and a second duct part adjacent thereto, an expansion joint joining said first and second duct parts and permitting relative axial displacement of the adjacent ends of the duct parts, said expansion joint including a first ring movable with said first duct part and extending around the periphery of the duct, a second ring movable with said second duct part and axially slidable relative to said first ring axially of the duct, means limiting the extent of said relative sliding of the rings, first and second gas-sealing means co-operating with the inner periphery of said first ring and the outer periphery of said second ring, said first and second gas-sealing means being spaced apart axially of the jet pipe, there being a leakage path between said first and second rings and said first and second gas-sealing means being in flow series in said leakage path, means including one of said rings defining a fuel collector space, the last-mentioned means being formed on one only of the duct parts, said fuel collector space being maintained in communication with said leakage path between said first and said second gas-sealing means throughout said limited axial sliding of the rings, and means to deliver said leakage fuel from said fuel collector space to within said passage in which working fluid flows.

9. In a gas-turbine power plant having a passage in which working fluid flows, a jet pipe for conveying working fluid during operation of the power plant and which is liable to be heated in operation of the power plant, said jet pipe comprising a first duct part and a second duct part adjacent thereto, an expansion joint joining said first and second duct parts and permitting relative axial displacement of the adjacent ends of the duct parts, said expansion joint including a first ring movable with said first duct part and extending around the periphery of the duct, second and third rings movable with said second duct part and extending on the inner and outer sides of said first ring respectively and axially slidable relative to said first ring axially of the duct, thus forming a leakage path through the joint between said first ring on the one hand and said second and third rings on the other hand from within the jet pipe to externally thereof, first gas-sealing means between the outer periphery of said second ring and the inner periphery of said first ring, second gas-sealing means between the outer periphery of said first ring and the inner periphery of said third ring, said first and second gas-sealing means being spaced apart transversely of the jet pipe and being in flow series in said leakage path, means defining a fuel collector space, the last-mentioned means being formed on one only of the duct parts, said fuel collector space being in communication with said leakage path between said first and said second gas-sealing means throughout the relative axial displacement of the ends of the duct parts, and means to deliver leakage fuel from said fuel collector space to within said passage in which working fluid flows.

10. A jet pipe of a gas-turbine plant having two adjacent ducting parts subject to being heated during operation of the plant, the adjacent ends of the ducting parts being capable of relative axial displacement to accommodate relative expansion, an expansion joint and fuel drainage collector interconnecting said adjacent ends and comprising two seals adapted to be placed in flow series in the leakage path through the joint from the passage through said jet pipe, fuel collector means adapted to be formed on one only of said duct parts and having a fuel collecting space connected throughout the relative displacement of the adjacent ends of the ducting parts to the leakage path between said two seals to receive leakage fuel therefrom, and pressure controlled means adapted to deliver said leakage fuel from the collecting space to within a working fluid passage of the plant.

11. A jet pipe for conveying a heated gas, which jet pipe comprises first and second duct parts and an expansion joint interconnecting the duct parts and permitting relative displacement of the adjacent ends of the duct parts, said expansion joint comprising a first ring on the end of the first duct part, a co-operating ring secured on the end of the second duct part and having an axially-extending portion to fit closely over said first ring, said axially-extending portion having a cylindrical internal surface, a pair of sealing rings carried externally by said first ring and co-operating in axially-spaced relation with said cylindrical surface of the axially-extending portion of the said co-operating ring, a sheet metal structure affording a closed chamber mounted externally of said co-operating ring and said second duct part and secured thereto, slot means in said axially-extending portion of the co-operating ring at a position axially between said pair of sealing rings and maintaining communication between said substantially closed chamber and the space between said pair of sealing rings throughout the extent of said relative axial displacement whereby fuel leaking along said axially-extending portion flows through the slots into said closed chamber and collects therein, a standpipe mounted on said second duct part and extending from the bottom of said closed chamber to within the duct, and means to supply gas under pressure to said closed chamber.

12. A jet pipe for conveying a heated gas, which jet pipe comprises first and second duct parts and an expansion joint interconnecting the duct parts and permitting relative axial displacement of the adjacent ends of the duct parts, said expansion joint comprising a first ring on the end of the first duct part, a co-operating ring secured on the end of the second duct part and having an axially-extending portion fitting closely over said first ring, said axially-extending portion having a cylindrical internal surface, means co-operating with the first and second rings and limiting relative axial displacement thereof, a pair of sealing rings carried externally of said first ring and co-operating in axially-spaced relation with said cylindrical surface of the axially-extending portion of the said co-operating ring, the extent of said axial spacing of the sealing rings being greater than the extent of said limited axial displacement, a sheet metal structure affording a closed chamber mounted externally of said co-operating ring and said second duct part and secured thereto, slot means in said axially-extending portion of the co-operating ring at a position axially between said pair of sealing rings, which slot means opens into and maintains communication between said substantially closed chamber and the space between said pair of sealing rings throughout the extent of said limited axial displacement, whereby fuel leaking along said axially-extending portion flows through the slot means into the closed chamber and collects therein, and means communicating with said closed chamber to deliver fuel therefrom.

References Cited in the file of this patent

UNITED STATES PATENTS

| | | | |
|---|---|---|---|
| 400,532 | Westinghouse | Apr. 2, | 1889 |
| 1,513,315 | Cook | Oct. 28, | 1924 |
| 1,947,072 | Walton et al. | Feb. 13, | 1934 |
| 2,026,182 | Leak | Dec. 31, | 1935 |
| 2,083,752 | Trussell | June 15, | 1937 |
| 2,204,374 | Metzgar | June 11, | 1940 |
| 2,526,236 | Ingres | Oct. 17, | 1950 |
| 2,578,501 | Boosinger | Dec. 11, | 1951 |
| 2,581,999 | Blatz | Jan. 8, | 1952 |
| 2,614,797 | Kidney | Oct. 21, | 1952 |
| 2,674,844 | Boyd et al. | Apr. 13, | 1954 |
| 2,707,967 | Adams et al. | May 10, | 1955 |
| 2,712,218 | Ritter | July 5, | 1955 |

FOREIGN PATENTS

| | | | |
|---|---|---|---|
| 668,607 | Germany | Dec. 7, | 1938 |
| 2,007 | Great Britain | Jan. 28, | 1896 |
| 315,789 | Great Britain | June 26, | 1930 |
| 399,759 | Great Britain | Oct. 12, | 1933 |